US009200414B1

(12) United States Patent
Brenner et al.

(10) Patent No.: US 9,200,414 B1
(45) Date of Patent: Dec. 1, 2015

(54) STRINGLESS PAVING TRAIN METHOD AND APPARATUS

(71) Applicant: GOMACO Corporation, Ida Grove, IA (US)

(72) Inventors: Mark W. Brenner, Ida Grove, IA (US); Raymond J. Bumann, III, Ida Grove, IA (US)

(73) Assignee: GOMACO Corporation, Ida Grove, IA (US)

( * ) Notice: Subject to any disclaimer, the term of this patent is extended or adjusted under 35 U.S.C. 154(b) by 522 days.

(21) Appl. No.: 13/748,647

(22) Filed: Jan. 24, 2013

Related U.S. Application Data

(63) Continuation-in-part of application No. 13/287,163, filed on Nov. 2, 2011, now Pat. No. 8,855,967.

(51) Int. Cl.
*G06F 11/00* (2006.01)
*E01C 19/00* (2006.01)

(52) U.S. Cl.
CPC .................................... *E01C 19/004* (2013.01)

(58) Field of Classification Search
CPC ............. E04B 2/02; E04F 21/02; E04F 21/22
USPC .......................... 702/150, 155, 182–185, 188
See application file for complete search history.

(56) References Cited

U.S. PATENT DOCUMENTS

| 5,774,374 | A | 6/1998 | Scott et al. |
| 6,452,684 | B1 | 9/2002 | Mennink |
| 7,044,680 | B2 | 5/2006 | Godbersen et al. |
| 7,643,923 | B2 | 1/2010 | Buehlmann et al. |
| 8,825,208 | B1 * | 9/2014 | Benson .................... E04G 21/22 52/749.14 |
| 2009/0142133 | A1 * | 6/2009 | Glee ..................... E01C 19/004 404/75 |

OTHER PUBLICATIONS

Stringless Portland Cement Concrete Paving, Center for Portland Cement Concrete Pavement Technology, Final Report, Feb. 2004, Iowa Department of Transportation and Department of Civil, Construction and Environmental Engineering at Iowa State University, Sponsored by the Iowa Department of Transportation and the Iowa Highway Research Board, Project TR-490.

* cited by examiner

*Primary Examiner* — Edward Raymond
(74) *Attorney, Agent, or Firm* — Suiter Swantz pc llo

(57) ABSTRACT

A method for paving a surface includes identifying the location of a first paving machine in a stringless paving train relative to a reference point and sending instructions to the first paving machine according to a road profile. The method further includes identifying the location of a second paving machine in a stringless paving train relative to the reference point and sending instructions to the second paving machine according to the road profile.

20 Claims, 7 Drawing Sheets

STRINGLESS PAVING TRAIN METHOD AND APPARATUS

PRIORITY

The present application claims the benefit under 35 U.S.C. §120 of U.S. patent application Ser. No. 13/287,163, filed Nov. 2, 2011, which is incorporated herein by reference.

FIELD OF THE INVENTION

The present invention is directed generally toward road building and particularly toward systems and methods for efficient resource allocation in stringless paving.

BACKGROUND OF THE INVENTION

Road construction is a complex, logistically intensive process. Traditionally, road construction requires a detailed survey of the topography of a desired route and a design profile of a road suitable for the desired route. The desired route may need to be graded to conform to certain standards before any road construction can actually begin. Once a route is graded, surveyors place stakes along the route and mark the desired thickness of the road. String lines are then run from one stake to the next at the marked height. Paving machines use the string lines to control the thickness of the road surface. The actual process of laying pavement may involve a train of machines. The paving train may include a spreader or belt placer to deposit concrete, a slipform paver to extrude the concrete into a slab, a dowel bar inserter to place dowel bars where a slab will be cut, and a texturing and curing machine to place appropriate textures in the road surface.

The machines in a paving train are generally equipped with sensors to follow the string line, and thereby produce a concrete slab having the desired thickness; however, string lines present a number of problems. A string line is only as precise as the number of stakes used to determine the course of the string line. Where the stakes are spaced twenty feet apart the string line represents a single data point every twenty feet. String lines are a physical obstruction. When machines need access to the surface being paved, string lines must be manually taken down and put back. The potential for human error is introduced every time a string line is taken down. Stringless paving technology may address many of the issues inherent in string line paving. Stringless paving utilizes systems other than string lines to control the paving train. Systems for controlling the paving train include Global Positioning System (GPS) satellites, Real Time Kinematics (RTK), and laser leveling.

Furthermore, when planning a pavement project, contractors with detailed surface data can save paving material, reduce the cost of concrete slabs, and reduce the cost of road surface modifications if they predict an overall estimated volume of paving material based on such data and utilize stringless paving techniques to control machines in a paving train.

SUMMARY OF THE INVENTION

Accordingly, the present invention is directed to a novel method and apparatus for controlling a stringless paving train.

One embodiment of the present invention is a method for managing a paving train. The method includes receiving a location of a first machine in a paving train, sending one or more commands to the first machine according to a design profile, receiving a location of a second machine in the paving train, and sending one or more commands to the second machine according to the design profile. The first machine also sends information to the second machine pertaining to the implementation of the design profile. Either the first machine or second machine can send information pertaining to a portion of paved route requiring additional finishing.

In another embodiment of the present invention, a method for producing a material list based on a design profile includes receiving information pertaining to a plurality of points along a route defined by a design profile and estimating material needs according to the design profile and information pertaining to the plurality of points. Estimated material needs may be amended according to information received from a machine in a paving train executing the design profile.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Terrain Preparation and Material Estimation

Stringless paving systems according to the present invention may utilize 3-D models of the terrain where a road will be built coupled with a paving profile to determine the position and orientation of each machine in a paving train. Surveyors may use specialized surveying instruments and techniques to produce a 3-D model of the terrain where a road will be built. Civil engineers may design a profile for the road based on the desired characteristics and projected traffic on the road. The design profile may include the thickness of the road, aggregate size, aggregate density and surface texturing.

Figure 1:
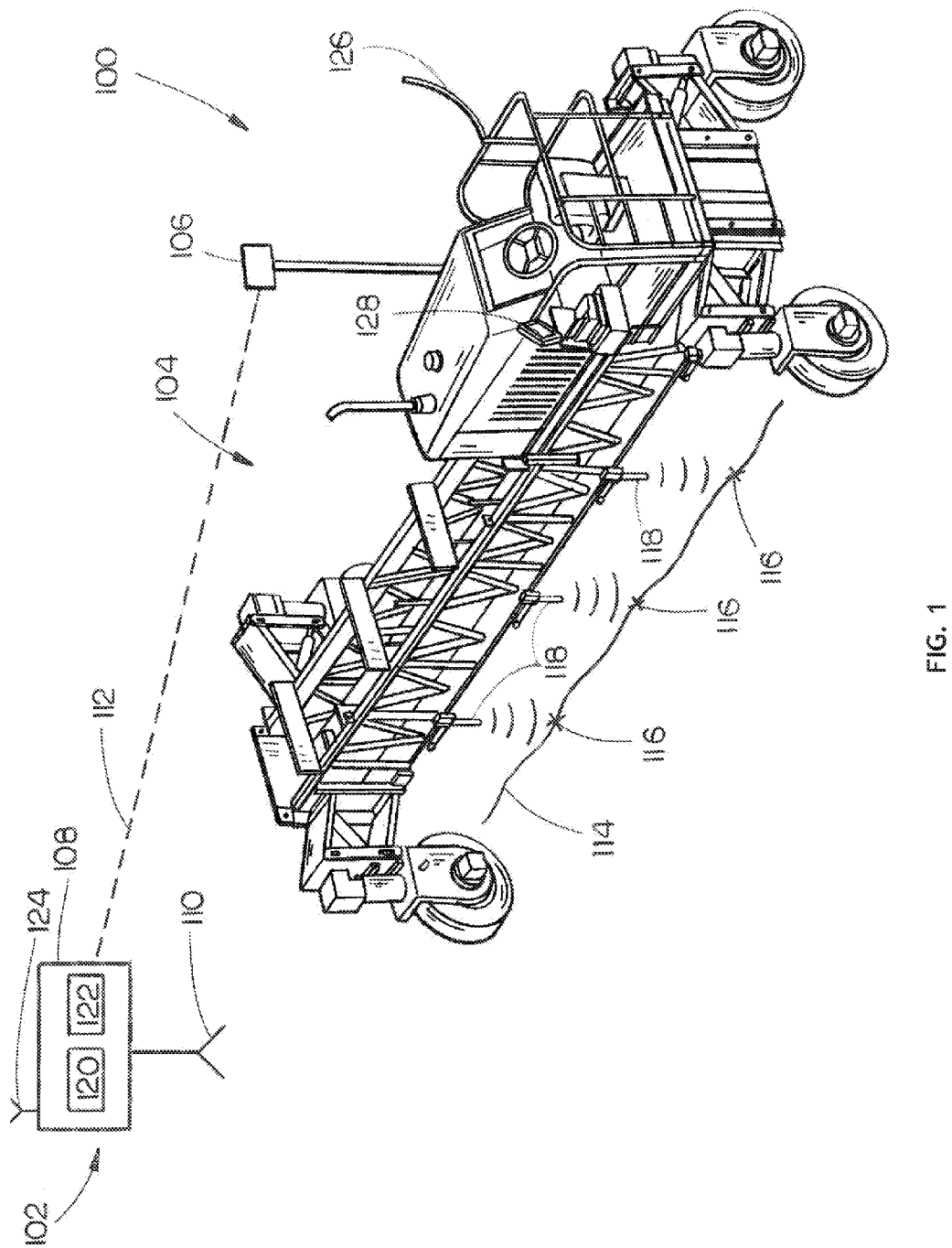
FIG. 1 shows a schematic diagram of a surface data measurement system including a position measurement station and a surface measurement apparatus.

Referring now to FIG. 1, a schematic diagram of a surface data measurement system 100 is shown. System 100 generally includes a position measurement station 102 and a surface measurement apparatus 104. The position measurement station 102 includes a known/predetermined location and may be configured to measure a position of a reference point 106 such as a laser mast on the surface measurement apparatus 104 relative to the position measurement station 102. The known/predetermined location of the position measurement station 102 may be acquired via current absolute positioning techniques, such as via Global Positioning System (GPS) data, survey data, and the like, or other suitable positioning techniques. In one implementation, the position measurement station 102 is a total station (i.e., a location position system) which utilizes a robotic tracking head 108 mounted on a stationary base 110. The robotic tracking head 108 sends a laser 112 to the reference point 106 (e.g., target) on the surface measurement apparatus 104 which is positioned on and/or traveling over a surface 114 on which surface data is to be acquired. The robotic tracking head 108 may track movement of the surface measurement apparatus 104 along surface 114 so as to gather a plurality of positions of the reference point 106 of the surface measurement apparatus 104 over time as the surface measurement apparatus 104 travels. The reference point 106 may be a prism or other device to reflect at least a portion of the laser 112 in order for the robotic tracking head 108 to measure the position of the reference point 106 of the surface measurement apparatus 104. While an implementation of system 100 has been described having a position measurement station 102 incorporating a laser 112, robotic tracking head 108, and prism, it is contemplated that position measurement station 102 may include other devices suitable for measuring a position of reference point 106 and/or the surface measurement apparatus 104, including, but not limited to, a camera and target, GPS receivers, laser masts, sonic sensors, and/or other world coordinate sensor combinations.

The surface measurement apparatus 104 is generally configured to measure elevation/distance/position of a plurality of points 116 on the surface 114 from a plurality of sensors 118 positioned on the surface measurement apparatus 104. In one implementation, the sensors 118 are non-contact sonic sensors positioned above the surface 114. However, it is contemplated that the sensors 118 may be any sensor (e.g., contact or non-contact) sufficient to measure an elevation/distance/position between the sensors 118 and the points 116 on the surface 114. Such sensors may include, for example, sonic sensors, laser sensors, cameras, and the like. An exemplary surface measurement apparatus 104 may be disclosed in U.S. Pat. No. 7,044,680, entitled "Method and apparatus for calculating and using the profile of a surface," which is incorporated in its entirety.

Each sensor of the plurality of sensors 118 is positioned at a known distance/position from the reference point 106 on the surface measurement apparatus 104, such that the reference point 106 has a known/pre-determined relative position difference (e.g., a 3-D position offset) from each sensor of the plurality of sensors 118. Thus, when a measurement is taken from a particular sensor, the distance/position difference between the point 116 on the surface 114 and the reference point 106 may be calculated by using the known distance/position difference between the sensor 118 and the reference point 106 and by using the measured elevation/distance/position between the sensor 118 and the point 116. In a particular implementation, the position of the plurality of sensors 118 may be adjusted to be nearer or farther from the surface 114, with the adjusted position being recorded so as to preserve a known distance/position difference between the reference point 106 and the sensor 118. An absolute position (e.g., real world coordinate (RWC)) may be determined for each point 116 via the calculated distance/position difference between the point 116 and the reference point 106 and the measured position of the reference point 106 of the surface measurement apparatus 104 (e.g., measured by the position measurement station 102, as described above). For instance, a processing unit (e.g., computer processor) on the surface measurement apparatus, on the position measurement station 102, or at a site remote from the system 100 may perform the absolute position calculations.

The position measurement station 102 may include one or more of a memory 120 and a communications interface 122 for storing or transmitting, respectively, the measured position of the reference point 106 of the surface measurement apparatus 104. In one implementation, the communications interface 122 interfaces with a transmitter 124 for transmitting the measured position to a receiver 126 on the surface measurement apparatus 104. In a particular implementation, the position measurement station 102 calculates a distance between the position measurement station 102 and the reference point 106 on the surface measurement apparatus 104 based on the measured position of the reference point 106 and the known location of the position measurement station 102. The position measurement station 102 may then transmit via the transmitter 124 the calculated distance and/or the measured position to the receiver 126 on the surface measurement apparatus 104.

The surface measurement apparatus 104 may include a display 128 to display data, including, but not limited to, the measured position of the reference point 106 of the surface measurement apparatus 104, the distance between the sensors 118 and the reference point 106, the measured distance between the sensors 118 and the points 116 on the surface 114, and the determined absolute position for each point 116. The display 128 may advantageously provide on-site data to personnel working with the position measurement station 102 and the surface measurement apparatus 104.

Figure 2:
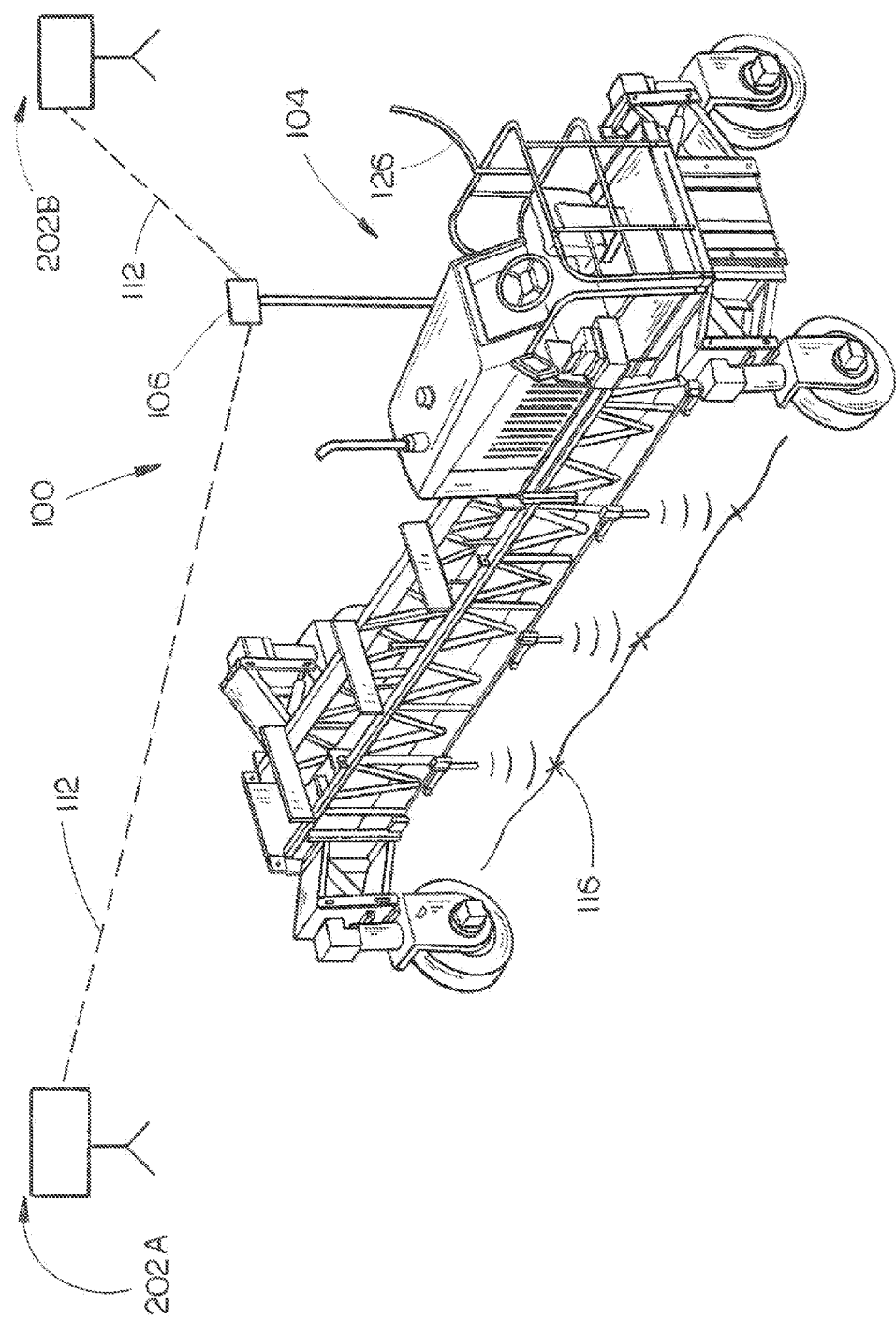
FIG. 2 shows a schematic diagram of the surface data measurement system of FIG. 1 including a plurality of position measurement stations.

Referring now to FIG. 2, a schematic diagram of the surface data measurement system 100 is shown with a plurality of position measurement stations 202a, 202b. While a single position measurement station may be repositioned to continue gathering data while the surface measurement apparatus 104 proceeds in a direction of travel, multiple position measurement stations may be utilized to provide continuous data collection without the substantial interruption to the data gathering associated with the repositioning of the position measurement station 102 in the single station implementation. As shown in FIG. 2, the position measurement stations 202a and 202b may be spaced apart in the direction of travel of the surface measurement apparatus 104, such that, for example, position measurement station 202a gathers data while the surface measurement apparatus 104 is near the position measurement station 202a and position measurement station 202b gathers data while the surface measurement apparatus 104 is near the position measurement station 202b, upon further travel of the surface measurement apparatus 104. The amount of separation between position measurement stations 202a and 202b depends on a desired amount of data collection overlap between the position measurement stations 202a and 202b. In one implementation, the position measurement stations 202a and 202b are spaced between approximately 300 feet and 600 feet from each other. Overlap may be desirably minimized to avoid data collection redundancy and to maximize a distance covered by the position measurement stations 202a and 202b. However, some degree of overlap may be useful in confirming accuracy/precision of data collection between position measurement stations 202a and 202b.

In operation, position measurement station 202a gathers data of the position of the reference point 106 on the surface measurement apparatus 104 for a period of time while the surface measurement apparatus 104 proceeds along the surface 114 in the direction of travel as indicated by the arrow 204. Once the surface measurement apparatus 104 reaches a certain distance from position measurement station 202a (e.g., a maximum operating distance), a test may be performed by the position measurement station 202b to verify that the position measurement station 202b is able to gather accurate data. Such a test may include, for example, a comparison of absolute position data of the points 116 on the surface 114 derived from the data collected by the position measurement station 202a and from the data collected by the position measurement station 202b. If the derived absolute positions are within a desired tolerance, then confirmation of the accuracy of position measurement station 202b is verified. Once verified, the position measurement station 202b may proceed to measure the positional data of the surface measurement apparatus 104 and the position measurement station 202a may stop gathering positional data. Based on the 3-D model of the terrain and the design profile, a computer may be programmed to produce an accurate estimation of materials necessary to produce the design profile over the terrain. The computer may utilize models relating the quantities of cement and aggregate necessary to produce a given quantity of concrete having the properties necessitated by the design profile. Similar methodology may be used to accurately estimate materials necessary to prepare terrain for paving. Materials necessary to prepare terrain for paving may include any materials necessary to create an appropriate base course such as crushed rock for an aggregate base and asphalt (bitumen).

Figure 3:
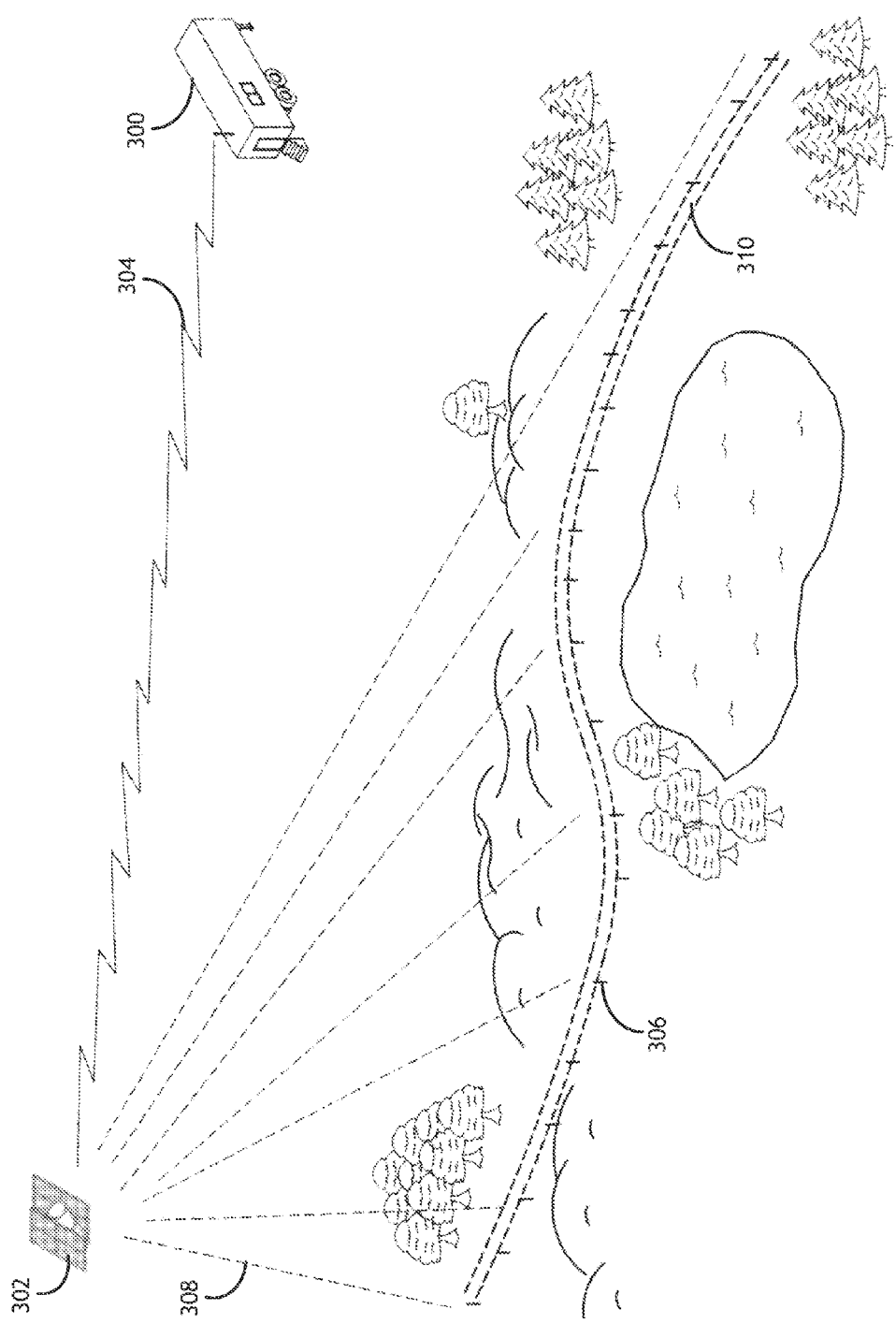
FIG. 3 shows a schematic diagram of a surface data measurement system including a data point markers identifiable by a satellite.

Referring to FIG. 3, a schematic diagram of a surface data measurement system including a data point markers identifiable by a satellite is shown. In one embodiment, a plurality of markers 310 define a design profile route. The markers 310 may be satellite communicable 308 such that a satellite 302 may identify each marker 310, acquire information from each marker 310 such as relative or absolute elevation and position. Such information may then be communicated 304 to a central control unit 300. Alternatively, each marker 310 may be GPS enabled such that each marker 310 may identify its own relative or absolute elevation and position and communicate such information to a central control unit 300.

A road builder utilizing methods for accurately estimating the materials necessary to build a particular profile over a given terrain can use resources more efficiently and complete the construction project for the minimum possible cost. First, trees are cleared from the future road's pathway 310. Cost of removing trees may be estimated based on information related to a particular terrain (such as tree density) in reference to the pathway 310 as defined by the plurality of markers 306. While removing trees, erosion control devices must be installed to keep the dirt from washing away. Erosion control can include silt fences, sediment basins or diversion ditches. These all help contain runoff from a cleared site. Such materials and associated labor costs may be estimated based on information associated with the plurality of markers 306 and a given profile.

After clearing comes the moving and mounding of dirt to create even surfaces and places for bridges. Cost estimates for earth moving may be made very accurate based on information associated with each marker 306 because each marker 306 records a precise elevation, and changes along a given pathway 310 is a critical component in determining earth moving requirements. When earth moving to fill major voids and remove major earth mounts is finished, the next step is rough grading. Rough grading evens the surface more, though not to a perfect level.

If the pathway 310 requires culverts, large concrete pipes in a box shape that divert streams from one side of a road to another, they are installed at this point in the process. After rough grading, storm pipes and drains are installed, as well as water and sewer items. This can be one of the lengthiest parts of the process.

Next, graders fine-grade the already rough graded pathway 310. This is called the subgrade. In this process, workers start meticulously grading the road to match the levels called for by engineers. The soil is then stabilized to add strength and durability to the subgrade. Stabilization is done with lime or cement or both. Engineers take samples of the soil and makes recommendations on how to stabilize it, depending on its characteristics. Such information may be incorporated into an amended materials list. Fine-grading is done again after stabilization.

Control Systems

Figure 4:
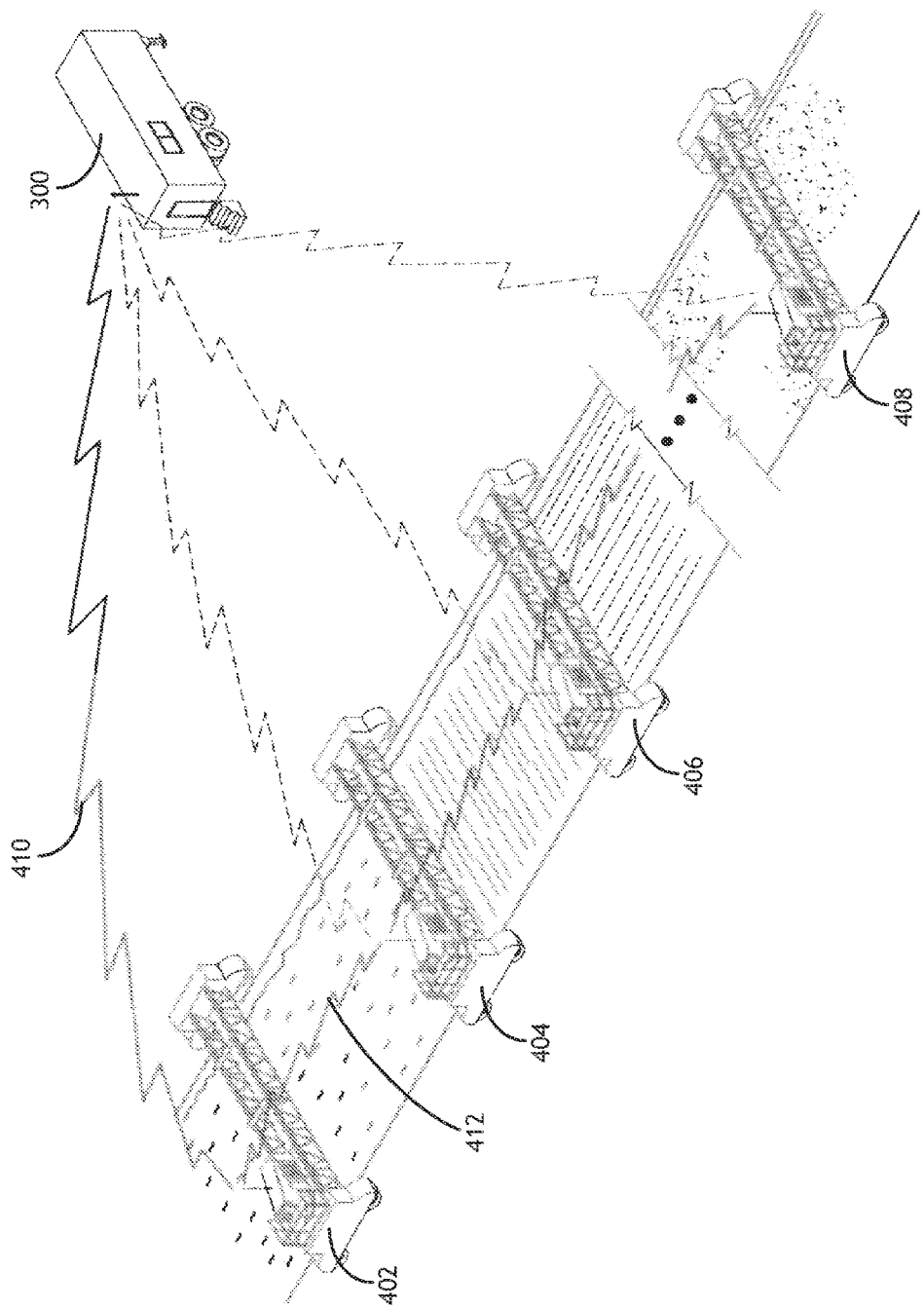
FIG. 4 shows a schematic of a paving train wirelessly connected to a central control unit.

Referring to FIG. 4, a schematic of a paving train wirelessly connected to a central control unit is shown. A control system according to the present invention may include a central control unit 300. The central control unit is in communication 410 with one or more machines 402, 404, 406, 408 in a paving train. Each machine 402, 404, 406, 408 performs one or more distinct functions in the paving train. Furthermore, each machine 402, 404, 406, 408 may include elements for examining a road surface in process. Information from such elements may be sent to the central control unit 300 or to the other machines 402, 404, 406, 408 in the paving train or both. Information from one of the machine 402, 404, 406, 408 may be used to modify the action of following machines 402, 404, 406, 408 in the paving train to correct deficiencies in the road surface or errors in the design profile.

Stringless paving may utilize any control system capable of delivering position and orientation information to the machines 402, 404, 406, 408 in the paving train with a sufficient degree of accuracy. Control systems may include GPS, RTK, laser leveling, photogrammetry, topographic mapping, phototopography (mapping of terrain based solely on photographs) or any other system or combination of systems for relating the position and orientation of a paving machine 402, 404, 406, 408 to the terrain.

One method for controlling machines 402, 404, 406, 408 in a paving train includes setting specialized surveying equipment at known points along the path of the road (such as markers 306 in FIG. 3). One type of specialized surveying instrument useful in this method is commonly called a total station. A total station is single instrument combining a theodolite and an electronic distance meter. In surveying applications a surveyor wishing to know the precise location of some feature places a target called a corner cube prism or corner reflector on the feature. The surveyor then places a total station at a known location. The total station may then determine the precise location and distance of the target relative to the total station. Based on that information and the known location of the total station, a surveyor can determine the precise location of the target and the feature identified by the target. A computer system may combine multiple measurements to create a topographical map.

Provided the exact position of a total station is known, the total station can determine the position of a machine 402, 404, 406, 408 in a paving train with great accuracy. A corner prism target may be placed at a precise, known location on a machine 402, 404, 406, 408 in a paving train. The total station may then determine the precise location of the target by the method set forth herein. A second corner prism may be placed at a different precise, known location on the machine 402, 404, 406, 408 and a second total station may determine the precise location of the second target. Based on all of that information, the location and position of the machine 402, 404, 406, 408, including elevation, may be determined with great accuracy. Each total station may include a radio to transmit the location and position data of the machine 402, 404, 406, 408 to other machines 402, 404, 406, 408 in the paving train or a central control unit 300.

A computer may be equipped to receive location and position data about the machines 402, 404, 406, 408 in the paving train from one or more total stations. The computer may be programmed to correlate the location and position data, and relate such data to a 3-D terrain model. The computer may also be configured to adjust certain features of the machine 402, 404, 406, 408 in a paving train to achieve the desired design profile. The computer may use feedback from one or more total stations to continually adjust features of one or more machines 402, 404, 406, 408 in the paving train.

Alternatively, a machine 402, 404, 406, 408 in a paving train may be equipped with a GPS antenna. The GPS signal available for commercial use may not provide sufficient accuracy on it own for road building applications. GPS combined with RTK may provide accurate positioning within a few centimeters. GPS generally cannot provide orientation data for a given machine 402, 404, 406, 408; therefore, a machine 402, 404, 406, 408 utilizing GPS may also require tilt sensors.

In addition to mechanisms such as GPS, a machine 402, 404, 406, 408 in a paving train may utilize one or more laser levels. Surveyors use a laser level to establish a horizontal plane visible within the line of site of the laser level. A laser level may be used in conjunction with a laser mast (such as the reference point 106 shown in FIG. 1). A laser mast is a device that detects the position of laser light along at least a portion of its length. One or more laser masts may be affixed to a known location on a machine 402, 404, 406, 408 in a paving train. A laser level placed at a known location may project a horizontal plane a known distance above ground level. A machine 402, 404, 406, 408 in a paving train with a laser mast affixed at a known location within the line of site of the laser level may detect the projected horizontal plane. The laser mast may determine the location of the projected horizontal plane along the length of the mast and relay such information to a computer either aboard a machine 402, 404, 406, 408, in a central control unit 300 or both. The computer may then determine the height of the machine 402, 404, 406, 408 relative to the laser level. Machines 402, 404, 406, 408 in a paving train often include hydraulic mechanisms to control the orientation of the machine 402, 404, 406, 408 and the height of the machine 402, 404, 406, 408 above ground level. A computer receiving information from a laser mast affixed to a machine 402, 404, 406, 408 in a paving train may be configured to adjust the hydraulic mechanisms of that machine 402, 404, 406, 408 to control the orientation and height of the machine 402, 404, 406, 408 and produce a road closely conforming to a design profile.

Road Construction

Figure 5:
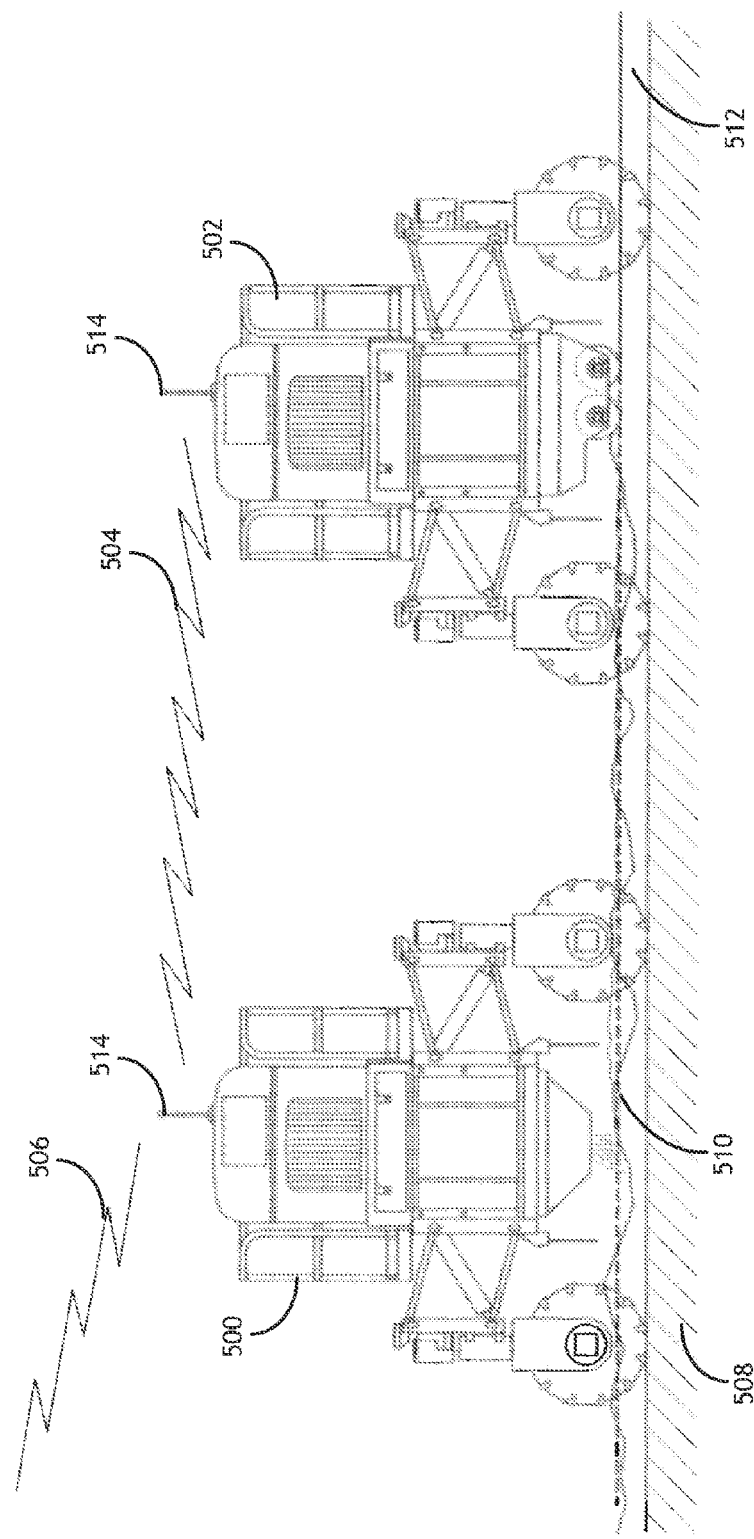
FIG. 5 shows a schematic diagram of two machines in a paving train wirelessly connected to each other.

Referring to FIG. 5, a schematic diagram of two machines in a paving train wirelessly connected to each other is shown. Once the terrain has been graded, road crews may deposit a layer of aggregate to form an aggregate base 508. Aggregate generally comprises crushed stone. The aggregate base may be graded.

Road crews may apply a base layer of asphalt over the aggregate base. The base layer may include crushed stone aggregate. Road crews may apply an intermediate layer of asphalt. The intermediate layer may include crushed stone aggregate. The crushed stone aggregate of the intermediate layer may be smaller on average than the crushed stone aggregate of the base layer.

Road crews may apply a surface layer 510 comprising cement concrete or asphalt concrete. The surface layer 510 may be deposited and processed by machines 500, 502 in a paving train, each machine 500, 502 equipped with a stringless control system, to produce a smoothed surface layer 512. The stringless paving control system may include a GPS antenna 514 affixed to a known location on the machine 500, 502 to relay GPS data to a computer. The GPS antenna 514 may further utilize RTK to provide more accurate position data than is possible using only commercially available GPS signals.

Alternatively, the stringless paving control system may include one or more cube prisms affixed to each machine 500, 502 in the paving train at a known location. One or more total stations may be placed at known locations along the terrain. The total stations may target the corner prisms on the machines in the paving train to determine the precise location of each machine relative to each total station. Each total station may transmit the precise location data for each machine to a computer. The computer may then determine Machines 500, 502 in a paving train may also be equipped to transmit and receive signals 504 from other machines 500, 502 in the paving train. Such signal 504 may include information pertinent to the execution of a design profile such as the location of voids that need to be filled to produce a smooth surface. Machines 500, 502 may use such signals to alter their operation in real time. Such signals 504 may be further communicated 506 to a central control unit.

Finished Road Properties

Figure 6:
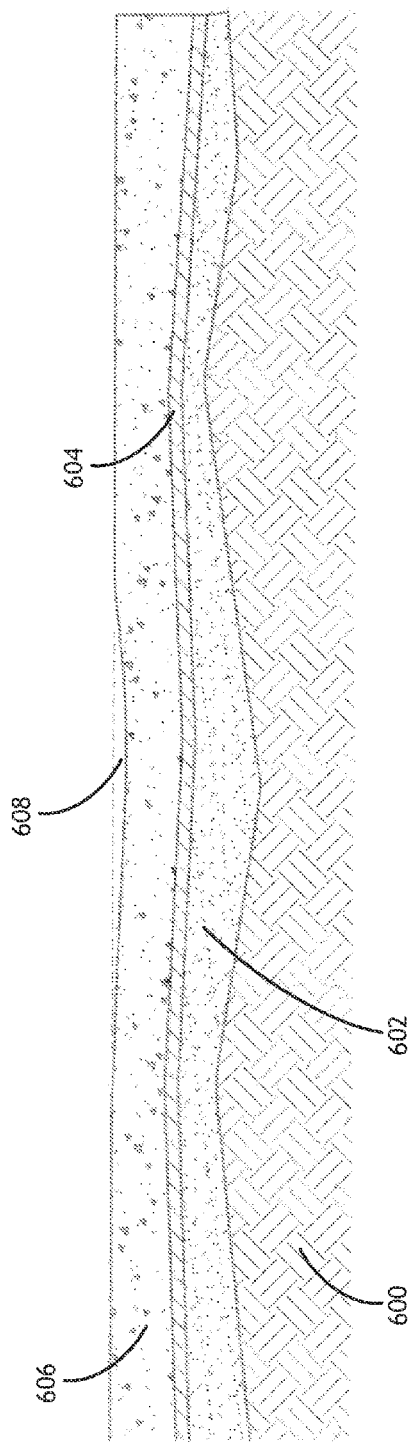
FIG. 6 shows a paved surface with a smoothness defect.

Referring to FIG. 6, a paved surface with a smoothness defect is shown. The road may include an aggregate base 600 to produce a rough desired grade. An asphalt base layer 602 may then be applied and an intermediate asphalt layer 604 applied to the base layer 602 to prepare a surface suitable for finishing. A smooth surface layer 606 is then applied. Where a design profile lacks information pertaining to surface features requiring correction, and there is no mechanism to make such corrections during construction, a road surface may include a defect 608.

Certain properties of a finished road may be extremely important. Some jurisdictions award bonuses based on the smoothness of a road. Profile designs generally call for a certain minimum road thickness while at the same time the authority paying for the road generally seeks the lowest bid. Road builders must meet the minimum thickness requirements with the least possible material. A defect 608 may necessitate expensive refinishing and retesting.

Figure 7:
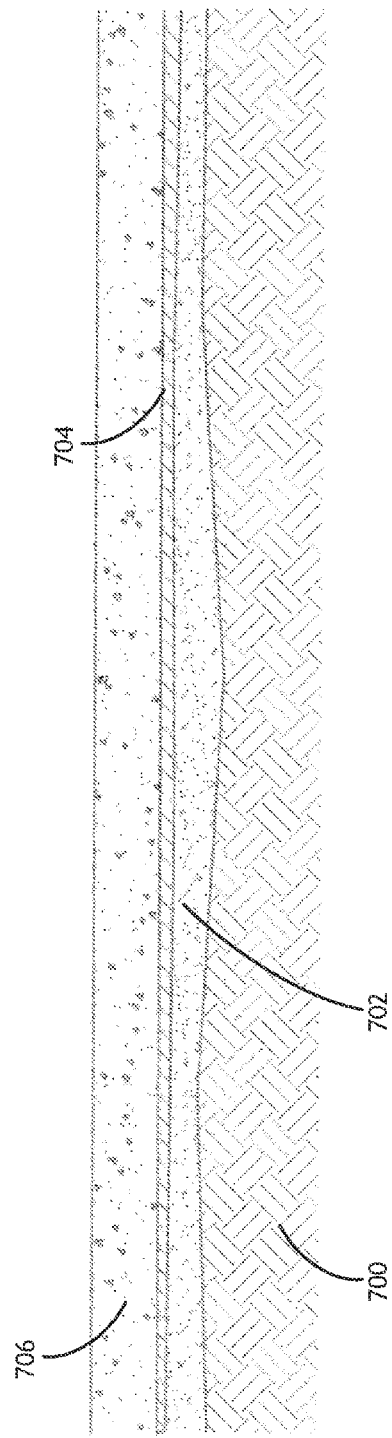
FIG. 7 shows a paved surface with a smooth finish.

Referring to FIG. 7, a paved surface with a smooth finish is shown. The road may also include an aggregate base 700 to produce a rough desired grade. An asphalt base layer 702 may then be applied and an intermediate asphalt layer 704 applied to the base layer 702 to prepare a surface suitable for finishing. A smooth surface layer 706 is then applied. In this case, the surface layer 706 includes no substantial defects because information pertaining to any regions where defects may have occurred is identified early in the construction process and corrected by machines in the paving train.

Figure 8:
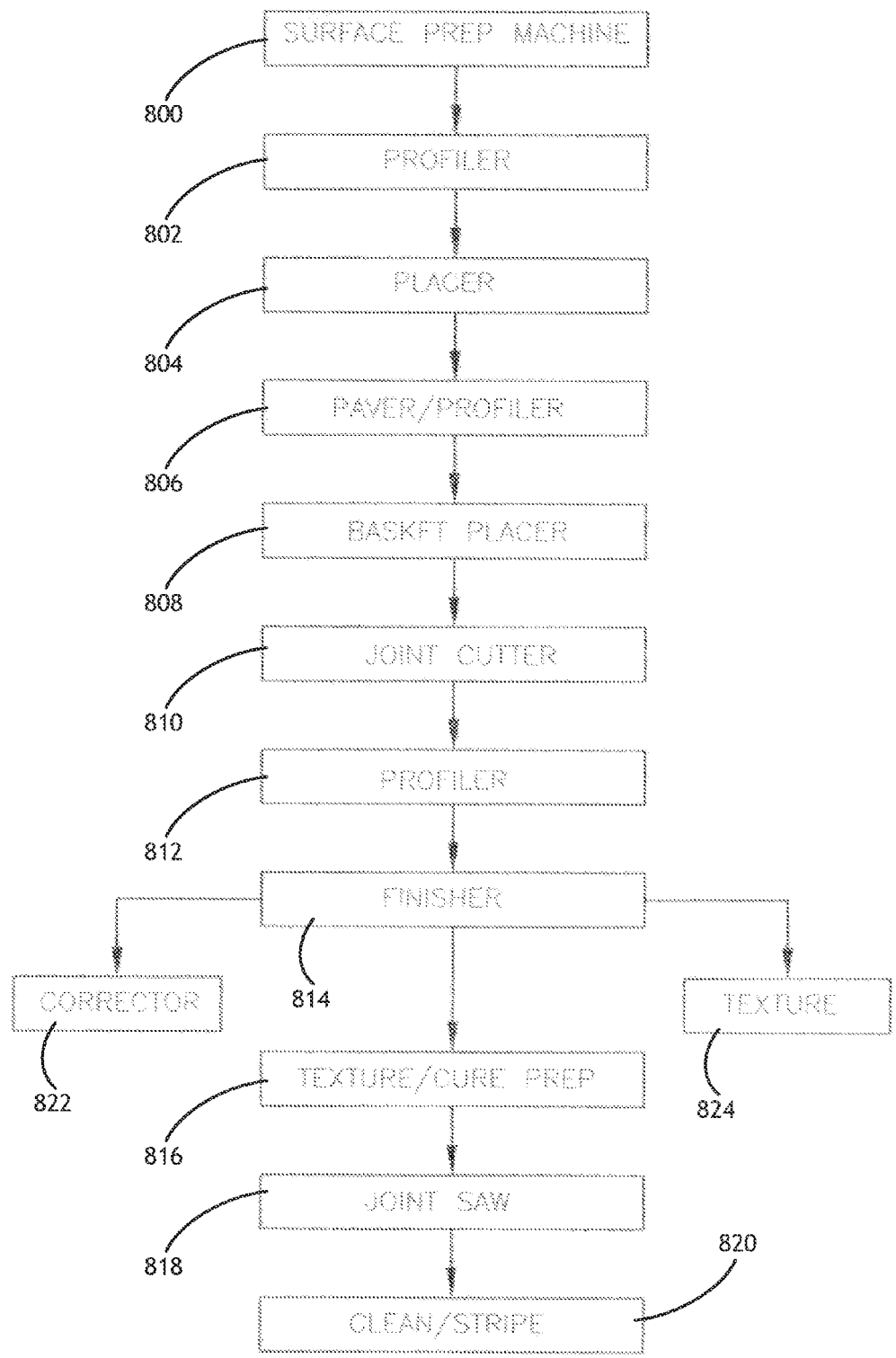
FIG. 8 shows a block diagram of a method for utilizing machines in a paving train.

Referring to FIG. 8, a block diagram of a method for utilizing machines in a paving train is shown. Where a route is defined, the area is prepared by removing trees and moving earth according to a design profile. The design profile may be produced according to embodiments of the present invention with markers and data derived from such markers. A paving train is then used to create a road. A surface prep machine roughly prepares 800 the road surface. A profiler then profiles 802 the prepared surface to identify any areas requiring special attention and confirm the prepared surface conforms to the design profile. A placer places 804 joint elements as necessary and according to the design profile to maintain the structural integrity of the finished surface. A paver then paves 806 the surface with asphalt or concrete according to the design profile. The paver may also include elements for scanning the surface to determine if any correction is necessary. Where such correction is necessary, a command may be send to a following machine in the paving train.

After paving, joint elements may be placed 808 to prevent vertical shifting in the road surface. Then expansion joints may be cut 810 where joint elements are placed 808. A final profiler may scan 812 the surface again to determine if any correction is necessary. If correction is necessary, a finisher may direct a corrector to apply 822 a correction, otherwise the finisher may finish 814 a surface (for example by screeding) and texturing 824 the finished surface.

Where additional texturing is called for, a machine in the paving train may apply 816 such texture and prepare 816 such surface to cure. As the surface cures, a joint saw may follow up the expansion joints cut 810 with additional joint saw cuts 818. Finally, the finished surface is cleaned and striped 820.

Because machines in the paving train may communicate with each other and precisely identify their own position and location, a finished surface may be produced within the limits of the design profile with a minimum of material overage. Where a machine in the paving train identifies an error, the error may be corrected contemporaneously so that no expensive resurfacing is required. Furthermore, because all of the machines are in data communication, and all of the machines may identify their precise locations through GPS or other means, no cumbersome string lines are necessary.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for paving a surface comprising:
   receiving location and position information associated with a first machine in a paving train;
   receiving location and position information associated with a second machine in a paving train; and
   sending a signal to the first machine in the paving train, wherein:
   the first machine is configured for stringless paving;
   the second machine is configured for stringless paving; and
   the signal pertains to a design profile.

2. The method of claim 1, wherein the location and position information associated with the first machine is determined with reference to GPS.

3. The method of claim 1, wherein the location and position information associated with the first machine is determined with reference to a laser level.

4. The method of claim 1, wherein the location and position information associated with the first machine is determined with reference to phototopography.

5. The method of claim 1, further comprising:
   identifying a surface defect with the first machine in the paving train; and
   sending an instruction to the second machine in the paving train to correct the defect.

6. The method of claim 5, wherein sending the instruction occurs directly from the first machine to the second machine.

7. The method of claim 5, wherein sending the instruction occurs from a central control unit.

8. The method of claim 1, further comprising estimating a materials list based on design profile and the location and position information of the first machine and the location and position information of the second machine.

9. An apparatus for controlling two or more machines in a paving train comprising: a processor; memory connected to the processor; and computer executable program code configured to execute on the processor, wherein the computer executable program code is configured to "receive location and position information associated with a first machine in a paving train; receive location and position information associated with a second machine in a paving train; and send a signal to the first machine in the paving train".

10. The apparatus of claim 9, wherein:
    the first machine is configured for stringless paving;
    the second machine is configured for stringless paving; and
    the signal pertains to a design profile.

11. The apparatus of claim 9, wherein the location and position information associated with the first machine is determined with reference to GPS.

12. The apparatus of claim 9, wherein the location and position information associated with the first machine is determined with reference to a laser level.

13. The apparatus of claim 9, wherein the location and position information associated with the first machine is determined with reference to phototopography.

14. The apparatus of claim 9, wherein the computer executable program code is further configured to:
    identify a surface defect with the first machine in the paving train; and
    send an instruction to the second machine in the paving train to correct the defect.

15. A paving apparatus comprising:
    a first machine in a paving train comprising:
       a processor;
       memory connected to the processor; and
       a sensor connected to the processor; and
    a second machine in a paving train comprising:
       a processor; and
       memory connected to the processor,
    wherein:
       the first machine is configured for stringless paving; and
       the second machine is configured for stringless paving.

16. The apparatus of claim 15, wherein:
    the first machine processor is configured to receive input from the sensor;
    the first machine processor is configured to send the input from the sensor to the second machine processor; and
    the second machine processor is configured to apply a correction to a paved surface based on the input.

17. The apparatus of claim 15, wherein the first machine further comprises a laser mast.

18. The apparatus of claim 15, wherein the first machine further comprises a GPS antenna.

19. The apparatus of claim 15, further comprising a central control unit in data communication with the first machine processor and the second machine processor.

20. The apparatus of claim 19, wherein the central control unit is configured to issue commands to the first machine and the second machine according to a design profile.

* * * * *